United States Patent
Wang et al.

(10) Patent No.: US 7,996,681 B1
(45) Date of Patent: Aug. 9, 2011

(54) METHODS FOR IMPLEMENTING COLOR CHANGE FREQUENCY AS IMAGE SIGNATURE

(75) Inventors: Jui-Pang Wang, Banciao (TW); Sheng-Chi Hsieh, Xindian (TW)

(73) Assignee: Trend Micro Incorporated, Tokyo (JP)

( * ) Notice: Subject to any disclaimer, the term of this patent is extended or adjusted under 35 U.S.C. 154(b) by 918 days.

(21) Appl. No.: 11/679,078

(22) Filed: Feb. 26, 2007

(51) Int. Cl.
*H04L 9/32* (2006.01)

(52) U.S. Cl. ........................................ 713/176

(58) Field of Classification Search .................. 713/176; 380/30, 54, 201; 382/100, 124, 125, 181, 382/232, 257, 258, 282, 305
See application file for complete search history.

(56) References Cited

U.S. PATENT DOCUMENTS 5,848,189 A * 12/1998 Pearson et al. ................ 382/218
2006/0171559 A1* 8/2006 Rhoads .......................... 713/176

OTHER PUBLICATIONS

Min Wu et al., "Data Hiding in Binary Image for Authentication and Annotation" IEEE Transactions on Multimedia, vol. 6, No. 4, Aug. 2004, p. 528-538.*

K. Hirotsugu, "An Image Digital Signature System with ZKIP for the Graph Isomorphism" Proc. IEEE International Conf. on Image Processing, ICIP-96, vol. 3, p. 247-250.*

* cited by examiner

*Primary Examiner* — Ellen Tran
(74) *Attorney, Agent, or Firm* — IP Strategy Group, P.C.

(57) ABSTRACT

A method for performing electronic signature verification for an entity is provided. The method includes creating a signature card for the entity by analyzing color change frequency of an initial electronic signature image. The method also includes comparing a second electronic signature image for the entity and the signature card to perform electronic signature verification.

20 Claims, 4 Drawing Sheets

EQUATION 1:
IMAGE COLOR CHANGE FREQUENCY DIFFERENCE = (IMAGE COLOR CHANGE FREQUENCY A − IMAGE COLOR CHANGE FREQUENCY B)$^2$

EQUATION 2:
VALID LINE RATE DIFFERENCE = (VALID LINE RATE A − VALID LINE RATE B)$^2$

EQUATION 3:
DIFFERENCE = $\sqrt{\text{(IMAGE COLOR CHANGE FREQUENCY DIFFERENCE + VALID LINE DIFFERENCE)}}$

FIGURE 4

METHODS FOR IMPLEMENTING COLOR CHANGE FREQUENCY AS IMAGE SIGNATURE

BACKGROUND OF THE INVENTION

Advances in technology have propagated the usage of computers. As computers become more affordable and the internet becomes an integral part of everyday life, many daily functions (e.g., correspondence, shopping, etc.) may be conducted electronically. The shift to an electronic environment has enabled more individuals and businesses to perform daily functions more efficiently.

In order to facilitate communications electronically, electronic signatures is gaining popularity as a method of identification. To protect against fraud, the computer industry has spent time and resources to develop tools and methods for validating and verifying electronic signatures.

Usually, electronic signature is an image. A common method for signature verification is by identifying similarity between images by analyzing the geometric objects and/or image vectors. In an example, the initial time an electronic signature image is received for a person, a file of geometric objects and/or images vectors may be created. This file may represent the electronic signature image and may be employed as a comparison against future incoming electronic signature images for the same person. As discussed herein, geometric objects refer to the different shapes that make up an image. Also, as discussed herein, image vectors refer to the positioning of the object, in other words, the degree and the distances of the objects.

In analyzing the geometric objects and/or image vectors of an electronic signature image, the image raw data may have to be retrieved multiple times in order to identify the geometric objects and the relationship between the geometric objects. This method of analyzing geometric objects and/or image vectors may be a long and tedious process that may require heavy CPU processing. In other words, this method requires the content of the image to be identified. Further, each aspect (e.g., the geometric shape, the positioning, the degree, the distance, etc.) of the image has to be analyzed.

BRIEF SUMMARY OF THE INVENTION

The invention relates, in an embodiment, to a method for performing electronic signature verification for an entity. The method includes creating a signature card for the entity by analyzing color change frequency of an initial electronic signature image. The method also includes comparing a second electronic signature image for the entity and the signature card to perform electronic signature verification.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In one aspect of the invention, the inventors herein realized that verification of an electronic signature image may be performed if the characteristics that uniquely define the electronic signature image are identified. The inventors also realized that an electronic signature image is not just defined by a combination of geometry objects and/or image vectors. Instead, an electronic signature image also has a unique color change frequency.

In accordance with embodiments of the present invention, a color change frequency method is provided for verifying and validating an electronic signature. Embodiments of the invention include analyzing the color change frequency of an electronic signature image to create a signature card, which is a base file of characteristics that uniquely identified the electronic signature image for an entity (e.g., person). Embodiments of the invention also include performing comparisons of incoming electronic signature images from the entity against the signature card to perform electronic signature verification.

In an embodiment of the invention, a color change frequency method for performing electronic signature verification is provided. The color change frequency method may include an analysis step and a comparison step. In the analysis step, a file of characteristic is created for an electronic signature image. In the comparison step, two or more images are compared against one another to determine the validity of an incoming electronic signature image.

In the analysis step, the electronic signature image is scanned in order to identify the color change frequency unique to the image. In an embodiment, the image may be divided into a set of base lines. Each base line representing a horizontal line of pixels from which changes in color frequency may be observed.

In an embodiment, the scanning process may identify a set of color change points. As discussed herein, a color change point is a point at which the color of the image is changing from one color to another color on a base line. For an image, a set of color change points may exist for each base line.

In comparison to the prior art methods, the analysis step of the color change frequency method is a relatively simple and cost efficient process that does not require a significant amount of time and resources to be implemented. The analysis step of the color change frequency method may be performed without requiring a complicated algorithm to identify the various geometric objects and/or image vectors of an image.

Once the color change frequency has been identified, a file of characteristics that is unique to the electronic signature image may be created. In an embodiment, only valid base lines and their corresponding set of color change points are considered in the creation of the file of characteristics. As discussed herein, a valid base line refers to a base line with a set of color change points that is above a color change threshold. In an embodiment, a base line with a set of color change point below the color change threshold may be considered as invalid and may be discarded in the creation of a file of characteristics for an electronic signature image.

A file of characteristics may be created each time an electronic signature image is received for an entity (e.g., person). In an embodiment, the file of characteristics that may be created the first time an electronic signature is received for the entity may become the entity's signature card and may be employed as the base file of characteristics from which all other incoming electronics signature images for the same entity may be compared against.

In an embodiment of the invention, the color change frequency method may also include a comparison step. In the comparison step, the incoming electronic signature image is compared against the signature card. To compare the two images, a comparison algorithm may be employed to determine the difference between the two electronic signature images. In an embodiment, the value of the difference between the two images may be compared against a tolerance threshold. The tolerance threshold may be a predefined threshold that may provide a level of tolerance for potential color bias and noises that may exist in an image. In an embodiment, the tolerance threshold may be a single value or may be a range of values. In an embodiment, an electronic signature image is considered a valid electronic signature if the difference between the incoming electronic image and a signature card is not above the tolerance threshold.

The features and advantages of the present invention may be better understood with reference to the figures and discussions that follow.

Figure 1:
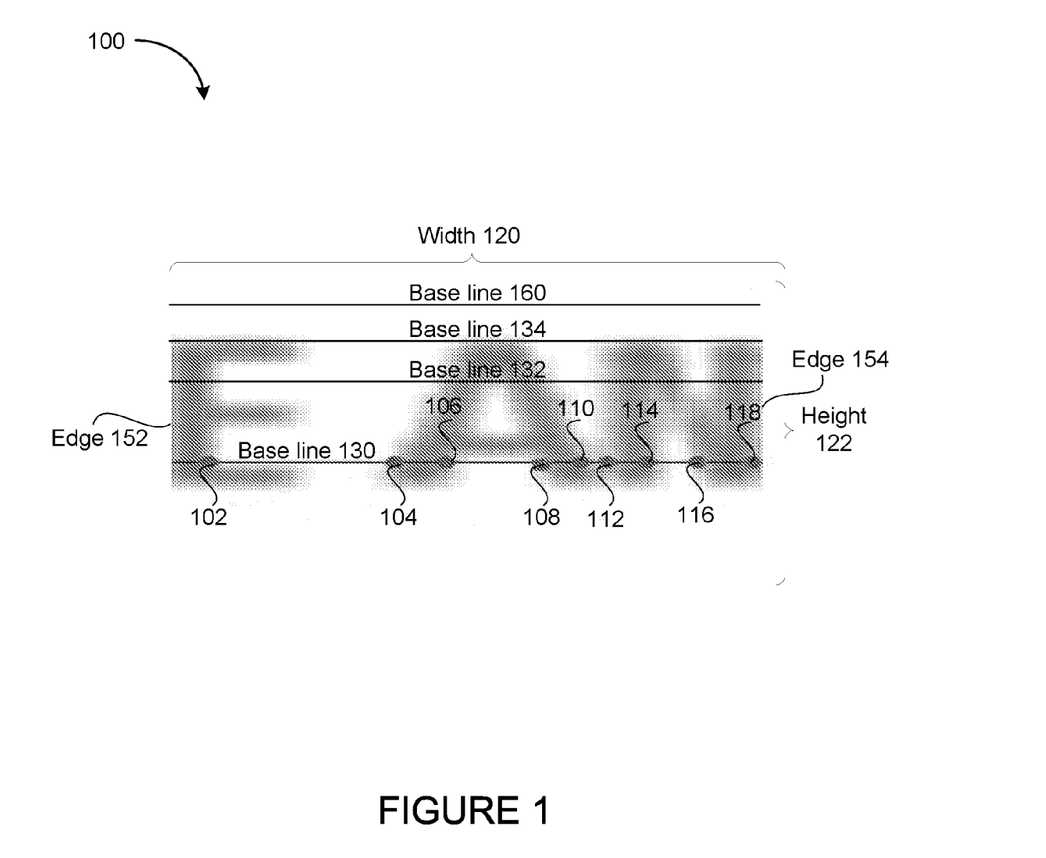
FIG. 1 shows, in an embodiment of the invention, a simple block diagram illustrating how a file of characteristics may be created for an image.

FIG. 1 shows, in an embodiment of the invention, a simple block diagram illustrating an image with color change points identified. Consider the situation wherein, for example, an image 100 is provided. Image 100 may have a height 122 of 100 pixels and a width 120 of 150 pixels. In an embodiment, image 100 may include a plurality of base lines (130, 132, 134, etc.). Each base line may represent a horizontal line of pixels from which changes in color frequency may be observed. In an example, base line 130 is a horizontal line that may extend from edge 152 to edge 154 of image 100. Although a file of characteristics may be formed for an electronic signature image with one base line, a more accurate file of characteristics may be created as the number of base lines increases. In this example, a file of characteristics may be more accurate if 100 base lines are being analyzed instead of just one base line.

Each base line may include a plurality of color change points. As discussed herein, a color change point is a point at which the color of the image is changing from one color to another color. By analyzing an electronic signature image to determine at which point on a base line a color change may occur, in this case there are nine points at which a color change may occur, the changes in color frequency may be identified. In an example, base line 130 may have nine color change points (102, 104, 106, 108, 110, 112, 114, 116, and 118). For example, at point 102 the color of the image is changing from the color gray to the color white. In another example, at point 104, the color of the image is changing from the color white to the color gray. Thus, each of the color change points (102, 104, 106, 108, 110, 112, 114, 116, and 118) may represent the point at which a new color is replacing the previous color.

To account for color changes without being overwhelmed by the creation of unnecessary color change points due to gradient changes in color (e.g. light gray vs. medium gray), color change points may be based on a color group change, in an embodiment. In an embodiment, a color table may be analyzed to define the color difference and to create the color groups. In an embodiment, to determine the perceptual uniform color difference, the RGB color may have to be transfer to the uniform color space (e.g., CIE1976Lab), which is defined by the International Commission on Illumination.

In an embodiment, a grouping method (e.g., agglomerative approach algorithm) may be employed to create the color groups. As discussed herein, a color group refers to a collection of colors that may be similar to one another. In an example, light gray, dark gray, and medium gray may be grouped together as one color group (e.g., color gray group). Thus, a color change in the image from a light gray color to a dark gray color may not constitute a new color change point. However, a color change in the image from light gray to white may constitute a color change point.

In an embodiment, a base line may be discarded if the frequency of color changes if less than a color change threshold. Consider the situation wherein, for example, the color change threshold is set at 4. In an example, a base line 160 may be one of a plurality of base lines for image 100. As shown in this example, base line 160 has no color change point. Since the number of frequency of color changes is less than the threshold, base line may be considered as unnecessary and may be considered as an invalid base line for analysis.

Once each of the base lines has been analyzed, an image color change frequency may be calculated by averaging the total number of color change frequency, in an embodiment. In an example, an electronic signature image may have 100 base lines. However, only 80 base lines are considered as valid (e.g., the number of frequency of color changes is greater than a threshold). The summation of frequency of color changes for the base line is 800. To calculate the average, the summation of frequency of color changes may be divided by the total number of base lines. In an embodiment, invalid base lines may not be included in the statistical calculation. In an example, the image color change frequency is the average of 800 lines divided by 80 base lines. Thus, the image color change frequency in this example is 8.

The implementation of statistical average is only an example of statistical methods that may be employed to determine the image color change frequency. Regardless of the statistical method employed, the purpose of the calculation is to filter out the noise that may exist based on the plurality of data that may be collected in analyzing the plurality of base lines of the image.

Figure 2:
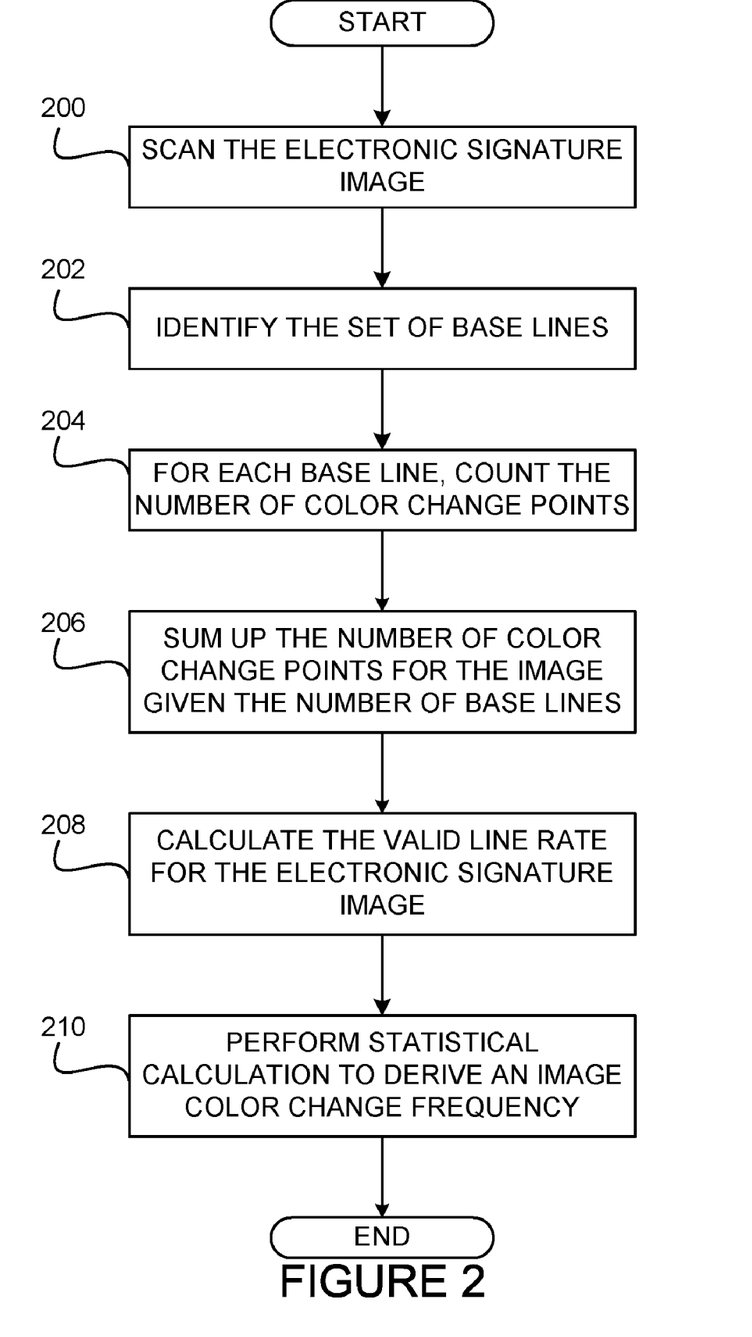
FIG. 2 shows, in an embodiment of the invention, a simple flow chart illustrating the method for identifying the frequency of color changes for an electronic signature image.

FIG. 2 shows, in an embodiment of the invention, a simple flow chart illustrating the method for identifying the frequency of color changes for an electronic signature image. Consider the situation wherein, for example, an electronic signature image for an entity (e.g., person) is being analyzed to create a file of characteristics that uniquely identified the electronic signature image.

At a first step 200, the electronic signature image is scanned. Unlike the prior art, which may require an electronic signature image be scanned multiple times in order to identify the content (e.g., geometric objects, image vectors, etc.), an embodiment of the invention provides a method for analysis which may enable a file of characteristics to be created with a single scan of the electronic signature image.

At a first step 202, a set of base lines may be identified for the electronic signature image. In an embodiment, the set of base lines may be a single base line. In another embodiment, the set of base lines may be a factor of the number of pixels for the height of an electronic signature image. In creating the file of characteristics, the number of base lines may provide a more accurate characteristic profile of the electronic signature image.

At a next step 204, identify (e.g., count) the number of color change points for each base line. In an example, base line 130 of FIG. 1 has nine color change points. The method of identify color changes may be performed by a simple program that goes through pixels of an image. The image may be decoded by employing general open source library, such as the IJG's jpeg library, the libpng of PNG organization, the libtiffof TIFF organization, the giflib of GIF organization, and/or the open source image library CxImage. In an embodiment, base lines that have a number of color change points less than a color change threshold may be considered as invalid lines and may be disregarded in creating a file of characteristics for the electronic signature image.

At a next step 206, the total number of color change points may be calculated by adding up the color change points for the set of base lines. In an embodiment, invalid base lines may be disregarded in calculating the total number of color change points.

At a next step 208, calculate the valid line rate for the electronic signature image. Consider the situation wherein, for example, an electronic signature image may have 100 base lines. However, of the set of base lines, only 80 base lines are considered as valid. To calculate the valid line rate, the number of valid lines (e.g., 80) is divided by the number of base lines (e.g., 100). In this example, the valid line rate is 80%.

At a next step 210, a statistical calculation (e.g., average) may be performed to compute the image color change frequency for the electronic signature image. In an example, the total number of color change points may be divided by the number of base lines to calculate an average. In an embodiment, the image color change frequency may be based on data collected on valid base lines only.

As illustrated in FIGS. 1 and 2, a file of characteristics may be created without having to perform complicated identification techniques and algorithms to identify the content (e.g., geometric objects, image vectors, etc.) of an electronic signature image, thereby eliminating the need to scan the electronic signature image multiple times. Unlike the prior art, the color change frequency of the electronic signature image may be quickly identified in one scan.

Since the color change frequency method may focus on analyzing color changes at a pixel level, in an embodiment, this method may be especially useful in analyzing complex images that may have a plurality of color changes. In the prior art, a complex image usually require an increase in the number of time the image raw data may have to be scanned. Thus, more time and CPU processing resources may be employed in order to identify the geometric objects and/or image vectors. Unlike the prior art, the color change frequency method does not require additional scanning of the image raw data. Instead, with the color change frequency method, a complex electronic signature image may be quickly reduced down to a set of color change points without requiring much more time and or resources. Thus, the color change frequency method is a cost efficient method for analyzing an electronic signature image, regardless of the image complexity.

In an embodiment, the method described in FIGS. 1 and 2 may be employed to create a base file of characteristics when an electronic signature is first employed to establish a "signature card" for an entity (e.g., people). In another embodiment, the same method may be employed to create file of characteristics for incoming electronic signature images for ongoing correspondences and transactions. In an example, a person may register with an online bank. As part of the register process, the user may be requested to send an electronic signature file. The online bank may employed the initial electronic signature image to create a signature card (i.e., base file of characteristics) from which all future incoming electronic signature images may be compared against.

Figure 3:
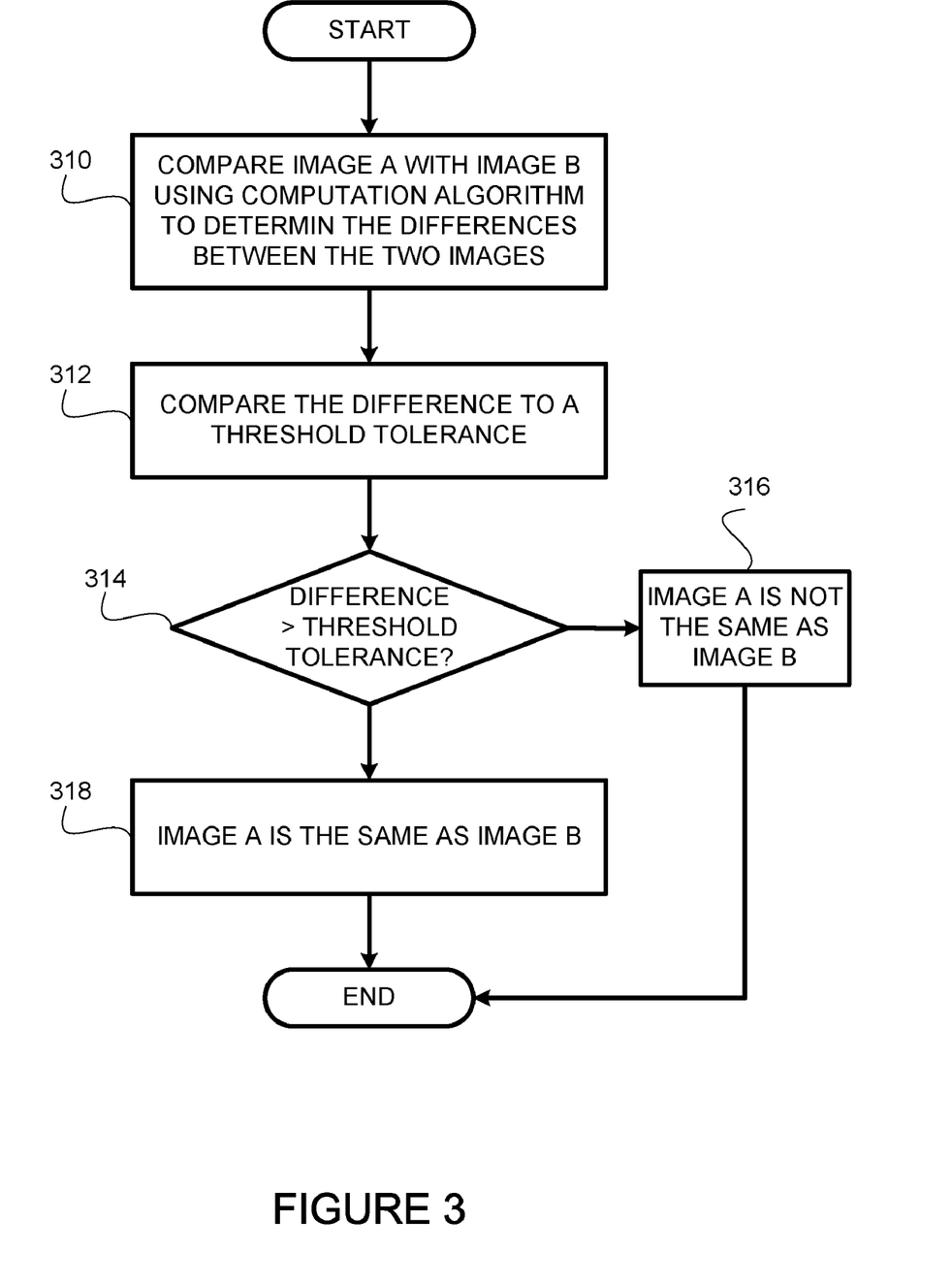
FIG. 3 shows, in an embodiment of the invention, a simple flow chart illustrating a method for verifying the validity of an incoming electronic signature image.

FIG. 3 shows, in an embodiment of the invention, a simple flow chart illustrating a method for verifying the validity of an incoming electronic signature image. Consider the situation wherein, for example, an electronic signature image for an entity (e.g., person) has been received. To simplify discussion, the incoming electronic signature image is designated as image A. Upon receipt, image A may be validated by comparing image A against a base file of characteristics for an electronic signature image for the same entity. In this example, the electronic signature image that has been employed to create the base file of characteristics is designated as image B.

At a first step 302, the method may perform the steps described in FIG. 2 to create a file of characteristics for image A.

Figure 4:
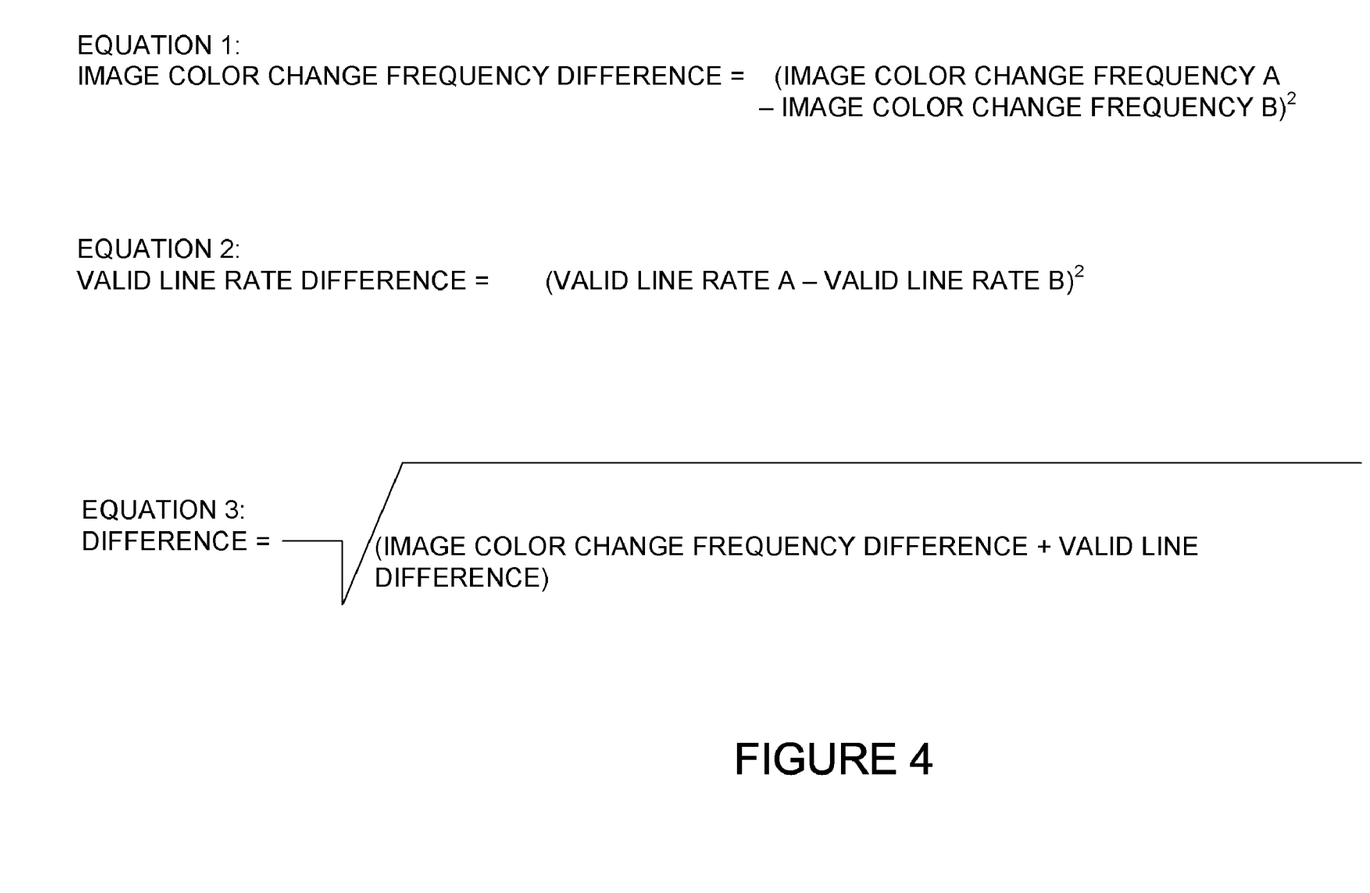
FIG. 4 shows, in an embodiment of the invention, an example of a comparison algorithm that may be employed to compare the two electronic signature images.

At a next step 304, the method may compare the two images to determine the differences between the 2 images. The equations shown in FIG. 4 shows, in an embodiment of the invention, an example of a comparison algorithm that may be employed to compare the two images.

To determine the image color change frequency difference between the two electronic signature images, Equation 1 may be applied to calculate the difference between the two electronic signature images. In an example, the image color change frequency of image A is 9 whereas the image color change of image B is 8. Thus, the image color change frequency difference is 1. In an embodiment, the value may be squared.

Next, the method may calculate the valid rate line difference between the two electronic signature images by applying Equation 2. In an example, the valid line rate for image A is 90 percent whereas the valid line rate for image B is 80 percent. Thus, the valid line rate is 10 percent in this example. In an embodiment, the value may be squared.

By applying Equation 3, the difference between the two images may be calculated. In an example, to determine the difference between the two images, the square root of the sum of the image color change frequency difference and the valid line rate difference may be calculated. In an example, the two numbers may be combined and the square root may be calculated from the sum to determine the difference between the two images. Thus, the difference between the two images is 1.05.

Equations 1-3 are examples of comparison algorithm that may be employed in comparing two images. This invention, however, is not limited to these equations. Instead, any comparison algorithm may be employed to perform the comparison between two electronic signature images and the discussions are meant as examples and the invention is not limited by the examples presented.

At a next step 306, the difference between the two images is compared to a tolerance threshold. In an embodiment, the tolerance threshold may be a single value. In another embodiment, the tolerance threshold may be a range. The tolerance threshold is set to account for possible noise and/or color bias that may exist, for example.

At a next step 308, the method may make a determination on whether or not the difference is less than the tolerance threshold.

If the difference is less than or equal to the tolerance threshold, then the two images are similar, at a next step 310.

However, if the difference is greater than the tolerance threshold than the two images are considered as dissimilar, at a next step 312.

The method describe in FIG. 3 provides a way for validating an electronic signature. The comparison method is simple and easy to calculate. Also, the tolerance threshold may account for color bias and noise (e.g., fuzziness) to provide a benchmark for determining the similarity between an incoming electronic signature and a signature card.

As can be appreciated from the forgoing, one or more embodiments of the present invention provide for a simple but cost effective electronic signature verification process. Also, the color change frequency method may require minimal time for analyzing an incoming electronic signature image and for validating the image against a signature card. Further, the complexity of an electronic signature image does not hinder the verification capability but instead complement the process by enabling the color change frequency method to create a more accurate file of characteristics for comparison.

While this invention has been described in terms of several preferred embodiments, there are alterations, permutations, and equivalents, which fall within the scope of this invention. Also, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fall within the true spirit and scope of the present invention.

What is claimed is:

1. A method for performing electronic signature verification for an entity, said method comprising:

ascertaining a count of color change points of a said first color change point set, said first color change point set including color change points identified on a set of lines of a first electronic image, said count of color change points of said first color change point set being less than a count of all pixels of said set of lines of said first electronic image, each color change point of said first color change point set being a pixel of a line of said first electronic image that is characterized by that a first portion of said line of said first electronic image is adjacent to a first side of said pixel of said line of said first electronic image, that a second portion of said line of said first electronic image is adjacent to a second side of said pixel of said line of said first electronic image, and that a color of said first portion of said line of said first electronic image is different from a color of said second portion of said line of said first electronic image, wherein said first electronic image is associated with said entity;

identifying, using a scanning device, a second color change point set;

determining, using a programmed computing device, a count of color change points of said second color change point set, said second color change point set including color change points identified on a set of lines of a second electronic image, said count of color change points of said second color change point set being less than a count of all pixels of said set of lines of said second electronic image, each color change point of said second color change point set being a pixel of a line of said second electronic image that is characterized by that a first portion of said line of said second electronic image is adjacent to a first side of said pixel of said line of said second electronic image, that a second portion of said line of said second electronic image is adjacent to a second side of said pixel of said line of said second electronic image, and that a color of said first portion of said line of said second electronic image is different from a color of said second portion of said line of said second electronic image; and comparing said second electronic image with said first electronic image using at least said count of color change points of said first color change point set and said count of color change points of said second color change point set.

2. The method of claim 1 further comprising generating a file of characteristics using said set of lines of said first electronic image, a number of color change points identified on each line of said set of lines of said first electronic image being above a threshold.

3. The method of claim 1 wherein said set of lines of said second electronic image includes horizontal lines of pixels of said second electronic image.

4. The method of claim 1 further comprising excluding invalid lines from said set of lines of said second electronic image when performing said determining, said excluding being performed by judging that a number of color change points identified on each invalid line of said invalid lines is below a threshold.

5. The method of claim 1 further comprising using a count of lines of said set of lines of said first electronic image and a count of lines of said second electronic image in performing said comparing.

6. The method of claim 1 further comprising:

dividing said count of color change points of said first color change point set by a number of lines of said lines of said first electronic image to calculate a first average value;

dividing said count of color change points or said second color change point set by a number of lines of said lines of said second electronic image to calculate a second average value; and using said first average value and said second average value in performing said comparing.

7. The method of claim 6 further comprising:

selecting said set of lines of said first electronic image from a set of horizontal lines of said first electronic image based on a number of color change points identified on each horizontal line of said set of horizontal lines of said first electronic image, a number of color change points identified on each line of said set of lines of said first electronic image being above a predetermined threshold;

dividing a number of lines of said set of lines of said first electronic image by a number of horizontal lines of said set of horizontal lines of said first electronic image to calculate a first rate;

selecting said set of lines of said second electronic image from a set of horizontal lines of said second electronic image based on a number of color change points identified on each horizontal line of said set of horizontal lines of said second electronic image, a number of color change points identified on each line of said set of lines of said second electronic image being above said predetermined threshold;

dividing a number of lines of said set of lines of said second electronic image by a number of horizontal lines of said set of horizontal lines of said second electronic image to calculate a second rate; and using said first rate and said second rate in performing said comparing.

8. The method of claim 7 further comprising:

selecting said set of lines of said first electronic image from a set of horizontal lines of said first electronic image based on a number of color change points identified on each horizontal line of said set of horizontal lines of said first electronic image, a number of color change points identified on each line of said set of lines of said first electronic image being above a predetermined threshold;

dividing a number of lines of said set of lines of said first electronic image by a number of horizontal lines of said set of horizontal lines of said first electronic image to calculate a first rate;

selecting said set of lines of said second electronic image from a set of horizontal lines of said second electronic image based on a number of color change points identified on each horizontal line of said set of horizontal lines of said second electronic image, a number of color change points identified on each line of said set of lines of said second electronic image being above said predetermined threshold;

dividing a number of lines of said set of lines of said second electronic image by a number of horizontal lines of said set of horizontal lines of said second electronic image to calculate a second rate; and using said first rate and said second rate in performing said comparing.

9. The method of claim 8 further comprising: calculating a valid line rate difference by subtracting said second rate from said first rate.

10. The method of claim 9 further comprising:

calculating a color change frequency difference by subtracting said second average value from said first average value;

calculating an image difference value using said color change frequency difference and said valid line rate difference; and comparing said difference value with a tolerance threshold.

11. An article of manufacture comprising a program storage medium having computer readable code embodied therein, said computer readable code being configured for performing electronic signature verification for an entity, said article of manufacture comprising:

computer readable code for ascertaining a count of color change points of a first color change point set, said first color change point set including color change points identified on a set of lines of a first electronic image, said count of color change points of said first color change point set being less than a count of all pixels of said set of lines of said first electronic image, each color change point of said first color change point set being a pixel of a line of said first electronic image that is characterized by that a first portion of said line of said first electronic image is adjacent to a first side of said pixel of said line of said first electronic image, that a second portion of said line of said first electronic image is adjacent to a second side of said pixel of said line of said first electronic image, and that a color of said first portion of said line of said first electronic image is different from a color of said second portion of said line of said first electronic image, wherein said first electronic image is associated with said entity;

computer readable code for determining a count of color change points of a second color change point set, said second color change point set including color change points identified on a set of lines of a second electronic image, said count of color change points of said second color change point set being less than a count of all pixels of said set of lines of said second electronic image, each color change point of said second color change point set being a pixel of a line of said second electronic image that is characterized by that a first portion of said line of said second electronic image is adjacent to a first side of said pixel of said line of said second electronic image, that a second portion of said line of said second electronic image is adjacent to a second side of said pixel of said line of said second electronic image, and that a color of said first portion of said line of said second electronic image is different from a color of said second portion of said line of said second electronic image;

computer readable code for comparing said second electronic image with said first electronic image using at least said count of color change points of said first color change point set and said count of color change points of said second color change point set; and circuits performing one or more tasks related to at least one of said computer readable code for said ascertaining, said computer readable code for said determining, and said computer readable code for said comparing.

12. The article of manufacture of claim 11 further comprising computer readable code for generating a file of characteristics using said set of lines of said first electronic image, a number of color change points identified on each line of said set of lines of said first electronic image being above a threshold.

13. The article of manufacture of claim 11 wherein said set of lines of said second electronic image includes horizontal lines of pixels of said second electronic image.

14. The article of manufacture of claim 11 further comprising computer readable code for excluding invalid lines from said set of lines of said second electronic image when performing said determining, said excluding being performed by judging that a number of color change points identified on each invalid line of said invalid lines is below a threshold.

15. The article of manufacture of claim 11 further comprising computer readable code for using a count of lines of said set of lines of said first electronic image and a count of lines of said second electronic image in performing said comparing.

16. The article of manufacture of claim 11 further comprising:
- computer readable code for dividing said count of color change points of said first color change point set by a number of lines of said lines of said first electronic image to calculate a first average value;
- computer readable code for dividing said count of color change points of said second color change point set by a number of lines of said lines of said second electronic image to calculate a second average value; and
- computer readable code for using said first average value and said second average value in performing said comparing.

17. The article of manufacture of claim 16 further comprising:
- computer readable code for selecting said set of lines of said first electronic image from a set of horizontal lines of said first electronic image based on a number of color change points identified on each horizontal line of said set of horizontal lines of said first electronic image, a number of color change points identified on each line of said set of lines of said first electronic image being above a predetermined threshold;
- computer readable code for dividing a number of lines of said set of lines of said first electronic image by a number of horizontal lines of said set of horizontal lines of said first electronic image to calculate a first rate;
- computer readable code for selecting said set of lines of said second electronic image from a set of horizontal lines of said second electronic image based on a number of color change points identified on each horizontal line of said set of horizontal lines of said second electronic image, a number of color change points identified on each line of said set of lines of said second electronic image being above said predetermined threshold;
- computer readable code for dividing a number of lines of said set of lines of said second electronic image by a number of horizontal lines of said set of horizontal lines of said second electronic image to calculate a second rate; and
- computer readable code for using said first rate and said second rate in performing said comparing.

18. The article of manufacture of claim 17 further comprising:
- computer readable code for selecting said set of lines of said first electronic image from a set of horizontal lines of said first electronic image based on a number of color change points identified on each horizontal line of said set of horizontal lines of said first electronic image, a number of color change points identified on each line of said set of lines of said first electronic image being above a predetermined threshold;
- computer readable code for dividing a number of lines of said set of lines of said first electronic image by a number of horizontal lines of said set of horizontal lines of said first electronic image to calculate a first rate;
- computer readable code for selecting said set of lines of said second electronic image from a set of horizontal lines of said second electronic image based on a number of color change points identified on each horizontal line of said set of horizontal lines of said second electronic image, a number of color change points identified on each line of said set of lines of said second electronic image being above said predetermined threshold;
- computer readable code for dividing a number of lines of said set of lines of said second electronic image by a number of horizontal lines of said set of horizontal lines of said second electronic image to calculate a second rate; and
- computer readable code for using said first rate and said second rate in performing said comparing.

19. The article of manufacture of claim 18 further comprising: computer readable code for calculating a valid line rate difference by subtracting said second rate from said first rate.

20. The article of manufacture of claim 19 further comprising:
- computer readable code for calculating a color change frequency difference by subtracting said second average value from said first average value;
- computer readable code for calculating an image difference value using said color change frequency difference and said valid line rate difference; and
- computer readable code for comparing said difference value with a tolerance threshold.

* * * * *